Dec. 11, 1923.

J. A. STAHLE

RESILIENT WHEEL

Original Filed April 16, 1920  2 Sheets-Sheet 1

1,477,292

Inventor.
John A. Stahle
by Heard Smith & Tennant.
Attys.

Dec. 11, 1923.
J. A. STAHLE
1,477,292
RESILIENT WHEEL
Original Filed April 16, 1920   2 Sheets-Sheet 2
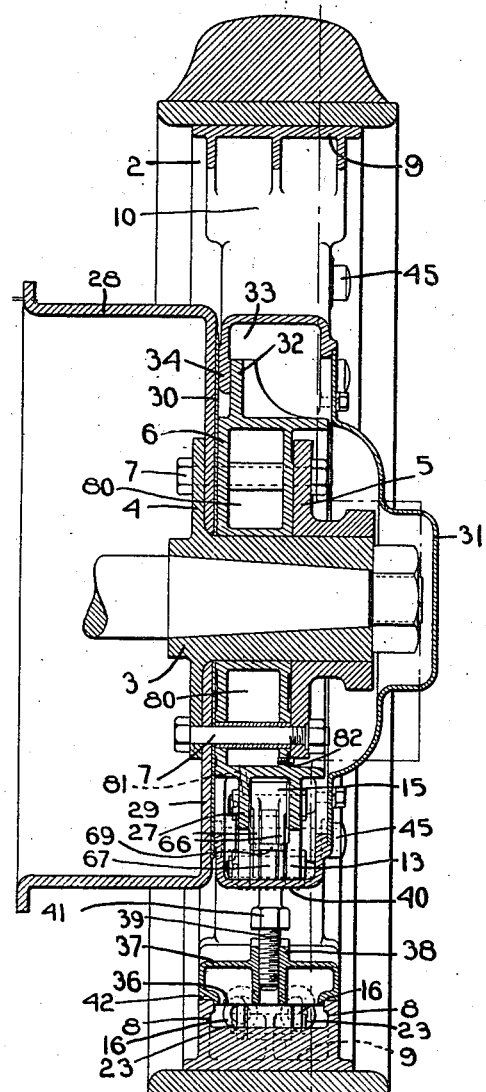
Inventor.
John A. Stahle
by Heard Smith & Tennant.
Attys.

Patented Dec. 11, 1923.

1,477,292

UNITED STATES PATENT OFFICE.

JOHN A. STAHLE, OF BOSTON, MASSACHUSETTS, ASSIGNOR TO STAHLE MECHANICAL TIRE COMPANY, LTD., OF BOSTON, MASSACHUSETTS, A CORPORATION OF MAINE.

RESILIENT WHEEL.

Application filed April 16, 1920, Serial No. 374,305. Renewed May 10, 1922. Serial No. 559,902.

*To all whom it may concern:*

Be it known that I, JOHN A. STAHLE, a citizen of the Republic of Finland, residing at Boston, county of Suffolk, State of Massachusetts, have invented an Improvement in Resilient Wheels, of which the following description, in connection with the accompanying drawing, is a specification, like characters on the drawing representing like parts.

This invention relates to vehicle wheels of that type comprising an inner or hub section and an outer or tire-receiving section which are connected by levers, links and springs, so that said hub section will be yieldingly sustained. One of the objects of the invention is to provide a novel construction by which ready access may be had to the springs so as to permit any spring to be easily removed or replaced should occasion for this arise. Another object of the invention is to provide a novel wheel structure in which the spring and lever connection are located in chambers which may be kept filled with lubricant thereby providing sufficient lubrication for the moving parts. Still another object of the invention is to provide a novel wheel structure in which any wear which may occur in the pivotal connections of the spring and lever construction may be readily taken care of so as to prevent the development of any back lash or loose movement.

Other objects of the invention are to improve resilient wheels of this type, all as more fully hereinafter set forth.

In order to give an understanding of my invention, I have illustrated in the drawings a selected embodiment thereof which will now be described, after which the novel features will be pointed out in the appended claims.

In the drawings, Fig. 1 is a sectional view through a wheel embodying my invention taken on substantially the line 1—1, Fig. 2;

Fig. 2 is a section taken on substantially the line 2—2, Fig. 1;

Fig. 3 is an enlarged section taken on the line 3—3, Fig. 1;

Fig. 4 is a sectional view on the line 4—4, Fig. 3;

Fig. 5 is a longitudinal sectional view through the link which connects the lever construction to the hub;

Fig. 6 is a fragmentary view showing the end of one of the pivot studs;

Fig. 7 is a section taken on the line 7—7, Fig. 4;

Fig. 8 is an end view of one of the pivot pins showing the protective cap which is applied thereto;

Figure 1:
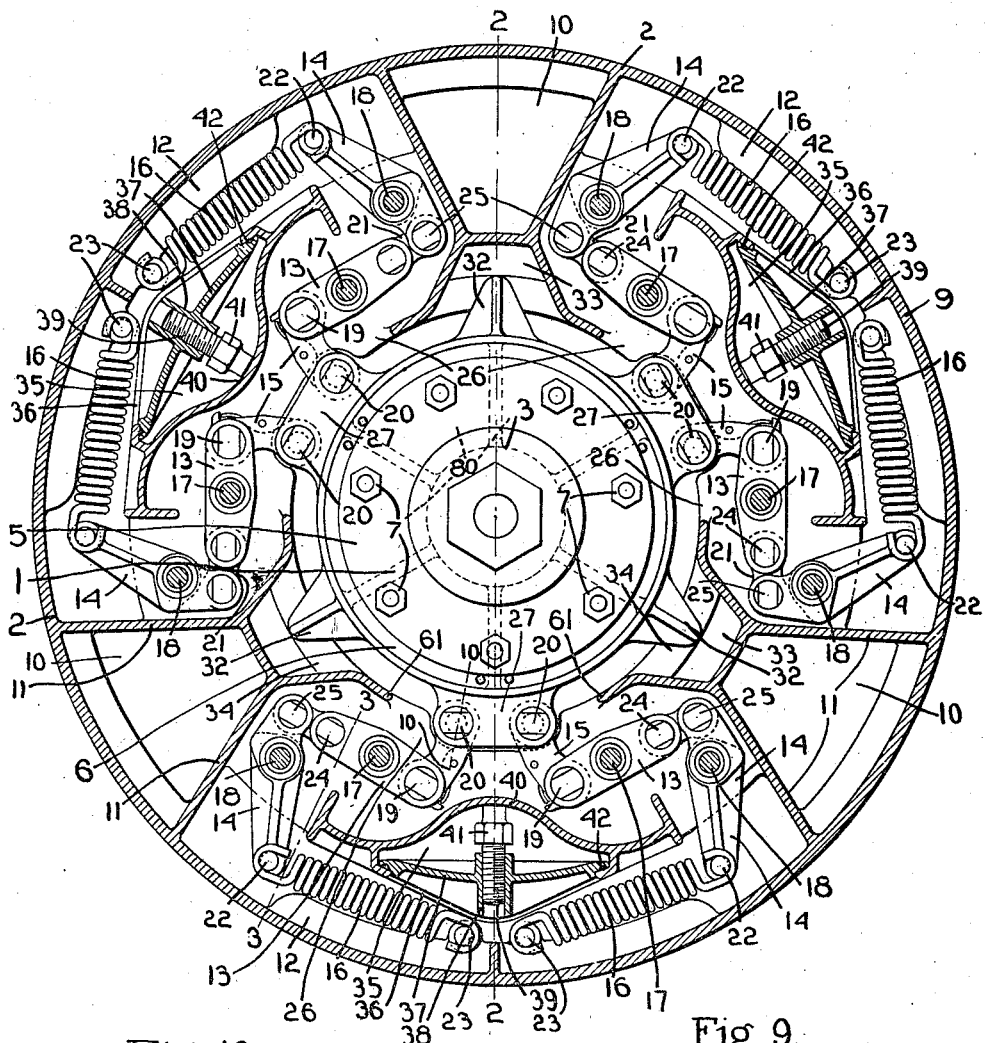

The wheel structure herein shown comprises an inner or hub member indicated generally at 1, an outer or tire-receiving member indicated at 2, and an arrangement of springs and levers connecting said members which give the desired resiliency to the wheel. The hub or central section of the wheel comprises a hub proper 3 having the usual hub flanges 4 and 5 and an annular member indicated at 6 which is clamped between the flanges 4 and 5 and held in position by suitable bolts 7 and to which the spring and lever connection is secured.

The outer or tire-receiving portion 2 may conveniently be made in the form of a casting, it having two parallel side walls 8 which are connected at their outer end by the circumferential wall 9. This tire-receiving member is also formed with a plurality of openings 10 extending therethrough within the peripheral wall 9, said openings being formed between transverse walls 11 which extend from one side wall 8 to the other. In the construction shown there are three such openings 10 thereby dividing the tire-receiving member into three chambers 12, each of which is adapted to receive one or more units of the spring and lever construction. In addition to the transverse partitions 11, there are other transverse partitions 40 connecting the side walls 8. These transverse partitions help to strengthen the wheel and also form chambers in which the spring-and-lever units are housed.

The spring and lever connections between the inner member 1 and the outer member 2 comprise a plurality of pairs of levers 13 and 14 pivotally connected together and pivotally mounted in the outer member 2, a link 15 connecting each pair of levers to the inner member 1 and one or more springs 16 connecting each pair of levers to the outer member 2. There may be as many pairs of levers and springs as desired, depending upon the size of the wheel and the load which it is to support. In the construction shown there are six pairs of levers, two pairs being received in each of the chambers 12 of the member 2. The levers 13 are pivotally mounted on studs 17 extending across the chamber 12 and supported in the walls 8 thereof, and the levers 14 are pivotally supported on studs or pivot pins 18 similarly sustained.

The levers 13 and 14 may have any suitable relative arrangement by which any radial displacement of the hub member relative to the tire-receiving member will operate to place the springs 16 under increased tension. I find the arrangement shown in the drawings to be satisfactory in which the levers 13 are situated so as to extend in a direction substantially at right angles to a radial line, and the levers 14 are situated so as to extend approximately in a radial direction.

One end of each lever 13 is connected to the annular section 6 of the hub portion by means of a link 15 and the two levers 13 and 14 of each pair are pivotally connected by a link 21. The inner end of each link 15 is received between two ears 27 formed on the annular member 6 and is pivotally mounted on a stud 20 sustained in said ears. The outer end of each link 15 is connected to the lever 13 by a pivotal stud 19. Each link 21 is connected to the levers 13 and 14 by the pivotal studs 24, 25. In the arrangement shown, the construction is such that when the wheel is not subjected to load, the pivotal pins 24, 25, 17 and 19 for each set of levers will be substantially in a straight line.

I have shown two pairs of levers 13 and 14 with their connections and springs in each of the chambers 12, and these levers and springs are preferably oppositely arranged so that the levers 14 are at the opposite ends of each chamber 12 and the springs 16 are secured to the member 2 at the central portion of the chambers.

When the wheel is not loaded, the inner and outer members will have the relative position shown in Fig. 1. When load is applied to the wheel the inner member 1 will tend to move downwardly under the action of the load, and this will operate through the links 15 at the lower side of the wheel to turn the levers 13, thereby moving the pivotal connections 24 inwardly toward the axis of the wheel. Such movement operates through the links 21 to swing the inner ends of the levers 14 inwardly thereby swinging the outer ends of said levers 14 in a direction to elongate the springs 16. Said springs, therefore, operate through the levers to resist this downward movement of the hub portion of the wheel relative to the outer portion 2. At the upper side of the wheel the downward movement of the hub portion relative to the outer portion 2 will operate through the links 15 to swing the outer ends of the levers 13 outwardly in a radial direction, and this movement will operate through the links 21 to turn the levers 14 in a direction to elongate the spring 16 so that the springs at the upper end of the wheel also come into action in supporting the load. Hence all of the springs are active at all times in supporting the load.

The chambers 12 in which the levers and links are received are open at their inner sides, as shown at 26, to permit of the connection between the levers and the inner member 1. The transverse walls 11 which connect the sides 8 are provided with extensions 61 and these extensions serve as the boundaries of the openings 26.

I propose to fill or partially fill the chambers 12 with grease or other lubricant for the purpose of keeping the moving parts lubricated, and during the rotation of the wheel, this lubricant will be thrown out to the peripheral portion thereof by centrifugal action.

The wheel is shown as having connected thereto a brake drum 28, said drum having the end 29 which is received between the hub flange 4 and the inner wall 8 of the outer member. I will preferably employ a suitable packing disk 30 between said drum end 29 and the wall 8 which will prevent any leakage of grease at this point. At the outer side of the wheel a cover plate 31 is employed which encloses the end of the hub and is fastened at its outer end to the outer wall 8 thereby preventing any leakage of lubricant at this point.

The annular member 6 is provided at intervals with outwardly-extending projections 32 which enter chambers 33 formed in the outer member 2 and which have flat faces that bear against the walls 34 of said chambers, as best seen in Fig. 2. These projections serve to prevent any lateral or axial movement of the outer member 2 relative to the inner member 1.

In designing my improved wheel I have aimed to provide a construction which will give ready access to the springs so that if any spring becomes broken or damaged, it can be easily removed and a new spring inserted in its place. I provide for this by making the outer portion of the wheel with transverse openings 35 which extend through the chambers 12 and by further providing said chambers with openings 36 situated immediately inside of the inner ends of the spring. Each opening is normally closed by a removable cover 37 which when removed permits access to the inner ends of the spring located in any chamber. The cover 37 is shown as having the interiorly screw-threaded boss 38 which receives a screw-threaded stud 39. The inner end of said stud is adapted to bear against a transverse wall 40 extending from one side 8 to the other and forming the inner boundary of the opening 35. Each stud is provided with a wrench-receiving portion 41 by which it may be turned, and when it is screwed inwardly against the wall 40 it operates to hold the cover 37 firmly in position. I propose to employ an annular packing or gasket 42 at the edge of the cover to make a tight joint. By unscrewing any stud 39, the cover is loosened and can be readily removed, thus permitting the springs to be reached through the opening 36.

The pivotal studs 17 and 18 extend clear through the walls 8 of the outer member 2. Each stud is provided at one end with a head 43 which is received in a recess in the wall 8 and which preferably comes flush with said wall, as shown in Fig. 4. The portion of the stud adjacent the head 8 has flattened sides 44 which fit a correspondingly-shaped aperture in a boss 62 formed on the inner face of the wall 8. These flattened faces hold the stud from turning movement. The opposite end of the stud projects through the opposite wall 8 and is protected by a suitable cap 45 which is secured to the stud by means of a pin 46. The wall 8 is formed with a recess to receive the edge of the cap 45, and the latter bears against the bottom of the recess, as shown in Fig. 4. Each cap is provided with projections 63 and the recess in the wall 8 is shaped to receive these projections. The purpose of the cap 45 is to protect the pivot pin from being injured by a blow. Any blow delivered against the wheel in line with the pivot pin will be received by the cap 45 and transmitted directly to the side wall 8 of the wheel. The pivot pin, therefore, will not suffer from any such blow.

Each pivot pin 17 and 18 has the construction above described and, therefore, all said pins are prevented from turning movement. I will preferably employ a loose sleeve 64 on each pivot pin which extends through the corresponding lever. The levers are provided with apertures 65 through which lubricant may be admitted to the bearing surfaces. The loose sleeves 64 will merely float on the pivot pins and by assuming different positions they serve to carry the lubricant around and equally distribute it.

Figure 10:
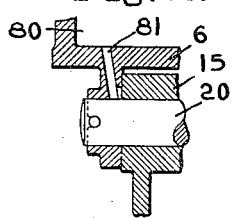
Fig. 10 is a fragmentary view showing the manner in which the pivot pins 20 are lubricated.

The manner in which the pivot pins 20 are lubricated is illustrated in Fig. 10. The member 6 of the inner section is formed with a plurality of lubricant-receiving chambers 80, there preferably being one such chamber for each of the pivot pins 20. Each chamber has communicating therewith a duct 81 which leads to the corresponding pivot 20. Each chamber 80 will be filled with grease or suitable lubricant through a filling opening 82, and this grease will be thrown by centrifugal action through the ducts 81 thereby to lubricate the pivot pins 20.

Figure 9:
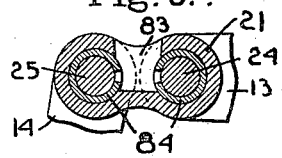
Fig. 9 is a view of one of the links 21.

In Fig. 9 I have shown a construction which may be employed for lubricating the pivot pins 24, 25. The link 21 is shown as having an opening 83 in its inner side which communicates with sleeves 84 that are loosely mounted on the pivotal pins 24, 25. This chamber 83 will become filled with lubricant as the wheel is used and the bushings 84 will, therefore, become properly lubricated. If desired these bushings may be provided with apertures which will allow the lubricant to pass through to the pivotal pins.

In order to prevent any lost motion in case wear should occur at the pivot pins 19, 20, I propose to employ the construction illustrated in Fig. 5. Each link 15 is provided with two flanges 66 between which is received a spring 67. The ends of the spring bear against plungers 68 that are located in the hubs of the link and bear against the pivot pins 19, 20. The spring is held under compression by passing under a pin 69 extending transversely across the flanges 66. The plungers 68 are long enough so that they extend beyond the hubs and, therefore, are always subjected to the action of the spring 67 which holds the inner ends thereof in frictional contact with the pivotal studs 19, 20. If the pivotal studs 19, 20 become worn at all, the spring-pressed plungers 68 will serve to hold the studs always against one wall of the openings in the link and thus any back lash or lost motion is prevented. Each link 15 is provided with projections 70 at the ends of the spring 67, said projections being for the purpose of preventing the spring from shifting longitudinally.

The hubs of each link 15 are provided with apertures 71 through which lubricant may pass to the pivot pins for lubricating the bearing surfaces.

I claim:

1. In a resilient wheel, the combination with a hub member, of an outer tire-receiving member having a plurality of chambers, spring and lever connections between said members located in said chambers, each chamber having an opening through which access may be had to the springs therein, and a removable cover for closing each opening.

2. In a resilient wheel, the combination with a hub member, of an outer tire-receiving member having side walls and a plurality of transverse partitions forming a plurality of chambers, spring and lever connections between said members located in said chambers, each chamber having an opening leading thereto through which access may be had to the springs therein, each opening being formed in one of the transverse partitions, and a removable cover for closing each opening.

3. In a resilient wheel, the combination with a hub member, of an outer tire-receiving member having side walls and a plurality of transverse partitions forming a plurality of chambers, spring and lever connections between said members located in said chambers, each chamber having an opening leading thereto through which access may be had to the springs therein, each opening being formed in one of the transverse partitions and being accessible from either side of the wheel, and a removable cover for closing each opening.

4. In a resilient wheel, the combination with a hub member, of an outer tire-receiving member having side walls and a plurality of transverse partitions forming a plurality of chambers, spring and lever connections between said members located in said chambers, each chamber having an opening leading thereto through which access may be had to the springs therein, each opening being formed in one of the transverse partitions, a cover for closing each opening, a locking stud having screw-threaded engagement with each cover and engaging a fixed part of the outer tire-receiving member whereby said cover plate is locked in position.

5. In a resilient wheel, the combination with an inner hub member, of a brake drum secured thereto, an outer tire-receiving member having side walls forming between them chambers, one of said side walls overlying the end of the brake drum, positioning projections on the hub member engaging said side wall and holding it in contact with the drum, and spring and lever connections in said chambers for connecting the outer member to the inner member.

6. In a resilient wheel, the combination with an inner hub member, of an outer tire-receiving member formed with two side walls and with transverse partitions connecting the side walls and forming chambers, positioning projections extending from the hub member into certain of said chambers and co-operating with one of the side walls to prevent lateral movement of the outer tire-receiving member, and yielding connections between said members located in other chambers.

7. In a resilient wheel, the combination with a hub member, of a brake drum secured thereto, an outer tire-receiving member encircling the hub member and formed with two spaced walls connected by transverse partitions which form chambers in the outer tire-receiving member, one of said side walls overlying the end of the brake drum, projections extending outwardly from the hub member into certain of said chambers and engaging said side wall thereby holding it in contact with the brake drum, and resilient connections between the hub member and tire-receiving member located in other chambers.

8. In a resilient wheel, the combination with an inner hub member, of an outer tire-receiving member encircling the hub member and provided with separated side walls forming between them chambers, a plurality of connected pairs of levers pivotally mounted between said side walls in said chambers, one lever of each pair extending at substantially right angles to a radial line and having one end connected to the inner member, the other lever of each pair extending approximately in a radial line, and springs acting on the outer ends of each of the radially-extending levers.

9. In a resilient wheel, the combination with an inner hub member, of an outer tire-receiving member encircling the hub member and provided with separated side walls forming between them chambers, pivot pins extending across said chambers and supported in said side walls, each pivot pin having at one end a head occupying a recess in one of the side walls and at the other end extending beyond the other side wall, a protecting cap enclosing the projecting end of each pin and bearing against the side wall, levers pivotally mounted on the pivot pins, a connection between said levers and the inner or hub member, and springs acting on said levers.

10. In a resilient wheel, the combination with an inner hub member, of an outer tire-receiving member encircling the hub member, pairs of levers, a link connecting the levers of each pair, means connecting said levers to the inner hub member, springs acting on said levers, and means for taking up any lost motion occasioned by wear in said link connection.

11. In a resilient wheel, the combination with an inner hub member, of an outer tire-receiving member, and a spring and lever connection between said members, said spring and lever connection comprising a plurality of pairs of levers, each lever having a pivotal stud, a link pivoted to said studs and connecting said levers, and spring-pressed plungers carried by each link and acting against said studs.

12. In a resilient wheel, the combination with a hub member having lubricant-receiving chambers, of an outer tire-receiving member, spring-actuated levers pivotally mounted on said tire-receiving member, links connected to said levers, and pivotal pins carried by the hub member and to which the links are connected, said hub member having ducts extending from said chambers to said pins through which lubricant may pass to the pins.

13. In a resilient wheel, the combination with an inner or hub member, of an outer tire-receiving member, a plurality of pairs of levers pivoted to the outer member, means connecting each pair of levers to the inner member, springs acting on each pair of levers, links for connecting the levers of each pair, and pivotal pins connecting the links with the levers, each link having an open lubricant-receiving chamber through which lubricant is delivered to the pivotal pins.

In testimony whereof, I have signed my name to this specification.

JOHN A. STAHLE.